United States Patent
Buhner

[15] 3,656,554
[45] Apr. 18, 1972

[54] LAWN EDGE TRIMMER BLADE

[72] Inventor: William A. Buhner, 320 Harvey Street at Hollywood, Daytona Beach, Fla. 99004

[22] Filed: Mar. 10, 1970

[21] Appl. No.: 18,141

[52] U.S. Cl. .............................. 172/14, 172/540, 172/771, 56/256, 56/295
[51] Int. Cl. ....................................................... A01b 45/00
[58] Field of Search ........................... 172/13–18, 118, 172/123, 36, 39, 41, 42, 606–607, 610, 547, 540, 349; 56/256, 295

[56] References Cited

UNITED STATES PATENTS

| | | | |
|---|---|---|---|
| 3,192,693 | 7/1965 | Bergeson | 172/13 |
| 2,775,856 | 1/1957 | Hoch | 172/14 |
| 2,913,058 | 11/1959 | Smith et al. | 172/14 |
| 3,102,376 | 9/1963 | Henderson | 172/15 |
| 3,225,527 | 12/1965 | Spear | 56/295 |
| 3,087,295 | 4/1963 | Grupp | 56/256 |
| 2,612,741 | 10/1952 | McKay | 56/256 |
| 3,554,293 | 1/1971 | Aman et al. | 172/13 |

Primary Examiner—Robert E. Pulfrey
Assistant Examiner—C. W. Hanor
Attorney—Burns, Doane, Benedict, Swecker & Mathis

[57] ABSTRACT

A lawn edge trimmer having a cutting blade mounted on an arbor connected with the drive shaft of the machine. The blade is provided with a hub portion mounted on the arbor or drive shaft and has opposite end portions curved outward relative to the axis of rotation thereof to create a desireable contour shape at the edge of a lawn or around a sprinkler head, etc.

8 Claims, 8 Drawing Figures

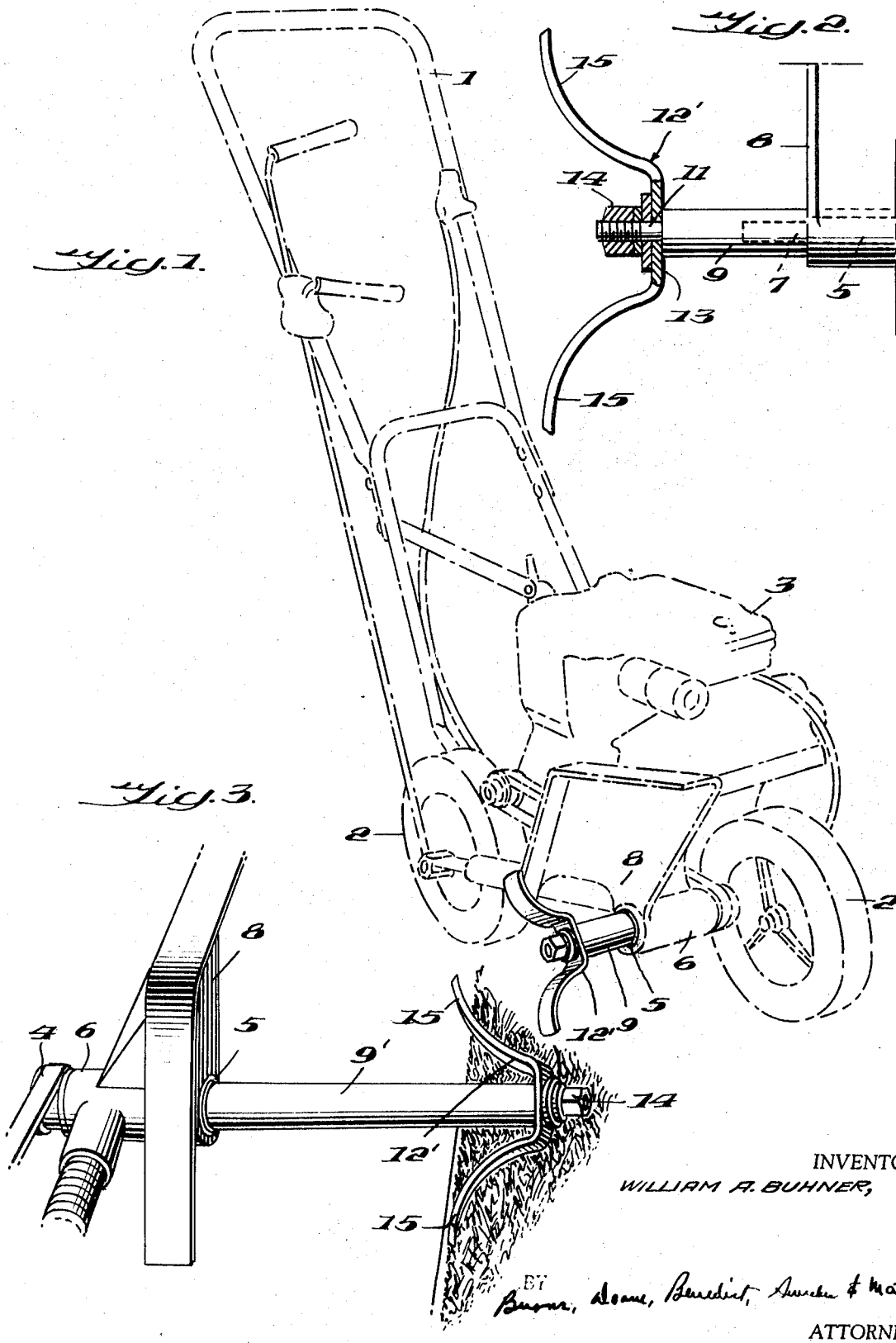

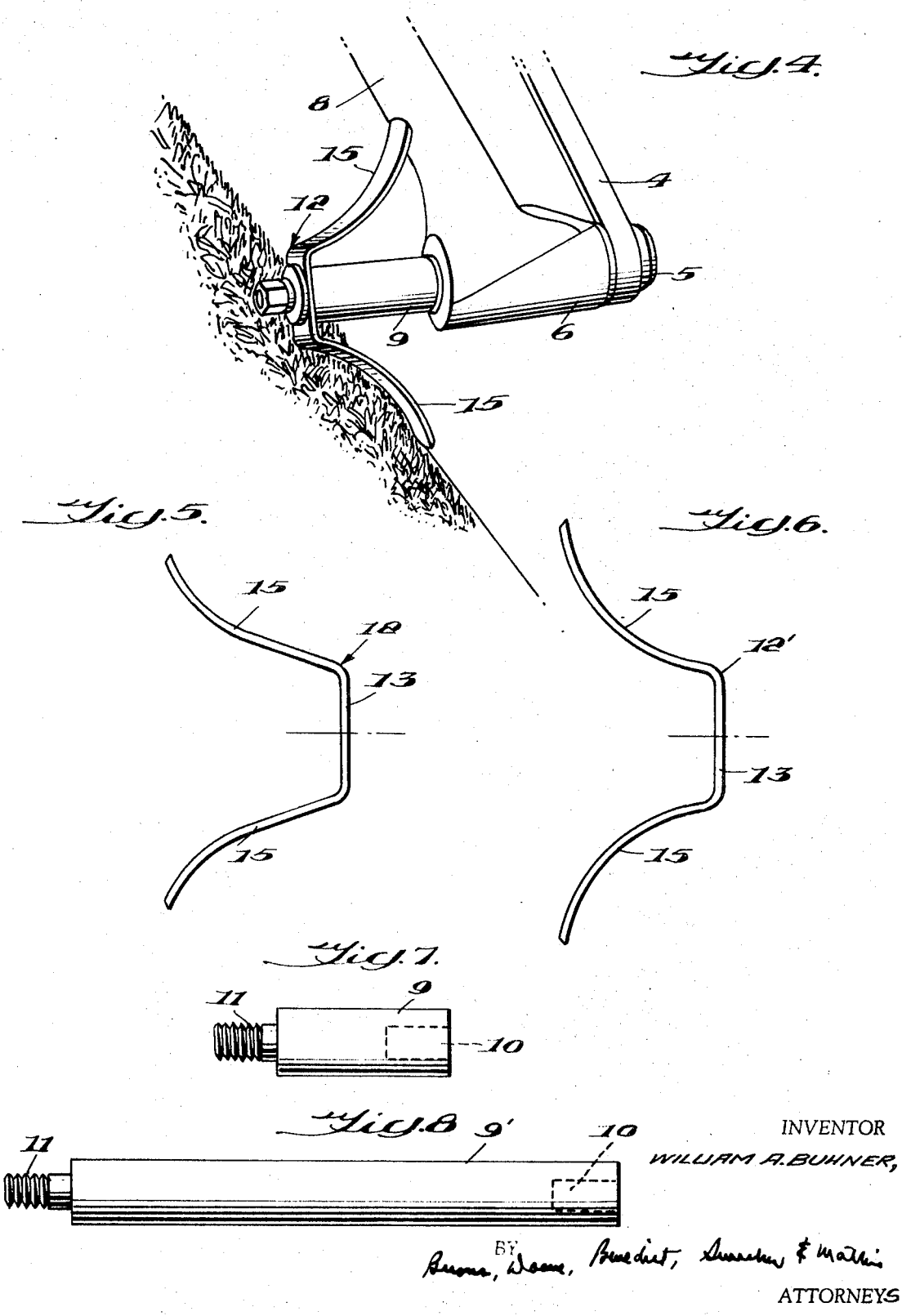

3,656,554

LAWN EDGE TRIMMER BLADE

SUMMARY OF THE INVENTION

This invention relates to improvements in lawn edge trimmers of the character used for trimming the edge of a lawn or along a walk or around a sprinkler head and the like.

Trimmers have been provided heretofore which will remove excess grass along the edge of a walkway or around a sprinkler head, but these merely trim it off and have not been constructed so as to provide a desired aesthetic edge form thereto.

One object of this invention is to create a curved or rolled profile to the lawn edge in the trimming thereof, along a walkway, at a sprinkler head or at a planting area within the lawn itself.

Another object of the invention is to improve the construction and function of lawn trimmers to enable these to operate in many different conditions and with respect to grasses of various heights and kinds, so as to obtain a more aesthetic appearance.

Still another object of the invention is to improve the character of blade provided for a lawn edge trimmer so as to produce a rolled or contoured edge shape to the grass in the trimming thereof which is distinctive and aesthetic in appearance.

These objects may be accomplished, according to one embodiment of the invention, by providing a lawn trimmer which has a power driven drive shaft and with an arbor mounted thereon for supporting a cutting blade or tool. This cutting blade or tool has a hub portion mounted on the arbor, with opposite end portions curved outward from the axis of rotation thereof through approximately 90°. The degree of curvature will depend upon the curved or rolled shape desired for the lawn edge, but it is preferred that the curve be of an elliptical character so as to give a long arc that will produce the desired profile on the edge of the lawn. A long or a short arbor may be used, according to the desired operation of the machine.

The blade may be operated about a horizontal axis for trimming the edge of a lawn along a walkway or may be turned to other position, as for trimming around a sprinkler head within the lawn. It may extend either outwardly or inwardly relative to the mounted position on the arbor.

BRIEF DESCRIPTION OF DRAWINGS

This embodiment of the invention is illustrated in the accompanying drawings, in which:

FIG. 1 is a perspective view of an arbor and blade mounted on a lawn edge trimmer shown in dotted lines;

FIG. 2 is a side elevation thereof, partly in section;

FIG. 3 is a perspective view, showing the blade in use along a walkway and having a long arbor;

FIG. 4 is a similar view, showing a short arbor;

FIG. 5 is a side elevation showing one form of cutting tool;

FIG. 6 is a similar view showing another form of cutting tool;

FIG. 7 is a side elevation of a short arbor; and

FIG. 8 is a similar view of the long arbor.

DETAILED DESCRIPTION OF THE DISCLOSURE

The invention may be used and applied to any suitable or desired form of lawn trimmer of the power driven type. I have illustrated diagrammatically in FIG. 1 one conventional form thereof which is manually propelled by a handle 1 upon suitable wheels at the front and back of the machine, as indicated generally at 2.

An engine is indicated at 3 for driving the cutter, the power shaft of which is connected through a belt 4, with a drive shaft 5 mounted in suitable bearings 6 on the frame of the machine. This drive shaft 5 has a projecting threaded end 7 at the outer side of a guard plate 8.

A cutter may be mounted directly upon the projecting end 7 of the drive shaft 5 if desired, although I prefer to mount an arbor thereon so as to locate the cutter at a point spaced outwardly from the end of the shaft and spaced from the guard plate 8. Two forms of arbors are shown, which differ from each other in length and are representative of variations in length that may be used. Any suitable or desired form of arbor may be employed as needed, and it may have suitable means to effect turning thereof, for screwing or unscrewing, relative to the shaft, such as flat surfaces or pin holes.

The arbors are shown at 9 and 9', the shorter of which is illustrated in FIGS. 1, 2, 4 and 7, while the longer arbor is illustrated in FIGS. 3 and 8. It is repeated that these relative sizes are merely illustrative of variations in size and length that may be used. The arbor may be constructed of any suitable steel or plastic material as found desirable.

Each of the arbors has a socket 10 in one end thereof of a size and character to be threaded onto the threaded end portion 7 of the drive shaft 5 where the one end of the arbor will be drawn up tightly against the outer end of the drive shaft 5 and thus form a continuation thereof. The opposite end of either arbor has a threaded shank 11 as a mounting for the cutting tool.

The cutting tool is indicated at 12 or 12', two forms of which are illustrated merely as examples of variations that may be used. The cutting tool may also be made of suitable steel, plastic material, or the like.

Each cutting tool has a hub portion 13 perforated at the center thereof, to be mounted upon the projecting end 11 of the arbor or upon the projecting end 7 of the drive shaft, as the case may be, if the arbor is not used. The cutter is locked in place by suitable fastening means, such as a nut 14, shown in FIG. 2, and the cutter should be anchored securely by friction or otherwise so as to rotate with the arbor or drive shaft.

At the opposite ends of the hub portion 13, the cutter is provided with blade portions 15 which extend back at an angle of approximately 90° to the hub portion 13 and then are curved outwardly through approximately 90°. The character of curve thus used may be varied according to the shape of contour desired in the finished edge form, but two different shapes are illustrated in FIGS. 5 and 6 as representative of variations that may be used. The curvature of these blade portions 15 is preferably of an elliptical shape rather than an arc of a circle to provide the desired contour shape to the edge of the grass, thus producing a more aesthetic appearance.

The blade portions 15 may be sharpened at one or both opposite edges thereof, either a continuous edge or a serrated or serpentine edge, if needed to facilitate cutting.

The cutting tool may be turned with the blade portions extending back upon the arbor, as in FIGS. 3 and 4, or outwardly from the end thereof, as in FIGS. 1 and 2. This is a matter of reversing the position of the cutting tool with respect to the arbor. The blade portions have opposite edge portions thereof sharpened if the cutter is to be reversed, so as to cut in either direction.

The various blade shapes described will not only edge or trim grass lawns, but will also produce a grass edge shape that may be called rolled or contoured and is more aesthetic is appearance than square edges, as have been produced heretofore. These contour shapes create an edge form which may be varied according to the desired profile.

The length of curvature of the blade portions of the cutter may be varied according to the height of the grass normally encountered and yet will provide the desired curved or rolled lawn edge wherever trimming is desired as, for example, along a walkway, around a sprinkler head or about a planting area within the lawn itself. The curve of the blade produces a desired curve to the grass in edging. Thus, it aesthetically curves this edge into a desired shape with a contoured silhouette, giving the appearance of a rolled shape.

Some of the advantages of this edger may be listed as follows:

1. Use of this curved edger blade in one of its forms, results in a curved, contoured, trimmed lawn edge result that is more aesthetically pleasing than a straight edge cut.
2. Lawns planted with a runner type grass such as St. Augustine, Bitter Blue, etc., have a marked vertical growth tendency, especially noticeable at lawn edges bordering walkways, etc. This height is maintained by dead runners forming a matted base with the new growth on the surface. The open high edges at the borders are without new growth and permit loss of water nutrients. This open edge also permits easy access and harbors many and various undesirable lawn pests with frequent disasterous results. Use of this curved edger blade permits control of this undesirable condition by contouring the lawn edge to the borders which eliminates the open side and maintains live grass to the edges. This reduces loss of water and nutrients and reduces infestation. A healthier lawn results.

3. Lawn edge height can be controlled as desired and the shape and form be established and maintained to the contour desired, depending upon the shape of the cutter used.
4. Existing lawn edges that have overgrown vertically, can be gradually reduced in height and contour form established to the form and height desired.
5. Lawn edges may be finished and maintained at the level of border walkways, etc., or trough cut made to accentuate the borders as desired.
6. A curved, contoured, lawn edge reduces the possibility of "scalping" in mowing by forming a gradual slope to the border walkways, etc.
7. With blade attached concave side out, vertical or trim cuts can be made on hedge sides that border walkways, etc. Use of a short arbor permits vertical trimming of hedges not contiguous to walkways, etc.
8. Lawn edge curbings may be contour cut and controlled by extending the cutting blade laterally when attached to a short arbor of correct length to place the blade in proper position to lawn edge when power edger equipment is in the gutter.
9. Horizontal positioning of this curved edger blade permits easy and rapid removal and shaping of grass around sunken sprinkler heads and plantings within the lawn itself.
10. Use of the curved contouring blade permits easy and quick removal and edge contouring of grass around sunken sprinkler heads by eliminating hand trimming.

While the invention has been illustrated and described in certain embodiments, it is recognized that variations and changes may be made therein without departing from the invention as set forth in the claims.

I claim:

1. In a lawn edger having a power shaft rotatable about an axis, and a cutting tool mounted on the shaft for rotation therewith about said axis, said cutting tool comprising a hub portion in a plane normal to the axis and with blade portions on the periphery of the hub portion with each blade portion extending generally axially outwardly from the periphery of the hub portion in a smooth curve which begins adjacent the hub portion and extends along the length of the blade portion substantially to a radially extending outer end thereof, said blade portions having longitudinal edges thereof sharpened to cut grass on a contoured edge.

2. In a lawn edger according to claim 1, wherein the blade portion extends approximately parallel with axis from the hub portion and curved outwardly from said parallel portion through approximately 90° with respect to said axis.

3. In a lawn edger according to claim 1, wherein the cutting tool blade portions at the periphery of the hub portion each is curved through approximately 90°.

4. In a lawn edger according to claim 3, wherein each blade portion at one end extends approximately tangent to a plane parallel with the axis and at the opposite end extends approximately tangent to a plane at right angles to the axis.

5. In a lawn edger according to claim 3, wherein the curve of each blade portion is a quadrant of an ellipse.

6. In a lawn edger having a power operated drive shaft with a projecting end and rotatable about an axis, an arbor mounted at one end on the drive shaft and extending outwardly therefrom, and a cutting tool mounted on the opposite end of said arbor, said cutting tool comprising an elongated hub portion in a plane normal to the axis and with blade portions on the opposite ends of the hub portion with each blade portion extending generally axially outwardly from said end of the hub portion in a smooth curve which begins normal to the end of the hub portion and extends axially and radially outward from the axis substantially to the outer end of the blade portion which is substantially parallel with the hub portion, said blade portions having longitudinal edges thereof sharpened to operate about the axis in cutting a curved edge to the grass.

7. In a lawn edger according to claim 6, wherein the curve of the blade portions extends through approximately 90°.

8. In a lawn edger according to claim 6, wherein the curve of each blade portion is a quadrant of an ellipse.

* * * * *